No. 629,095. Patented July 18, 1899.
I. STEARNS.
HOT AIR PIPE FOR FURNACES.
(Application filed Mar. 16, 1898.)
(No Model.)
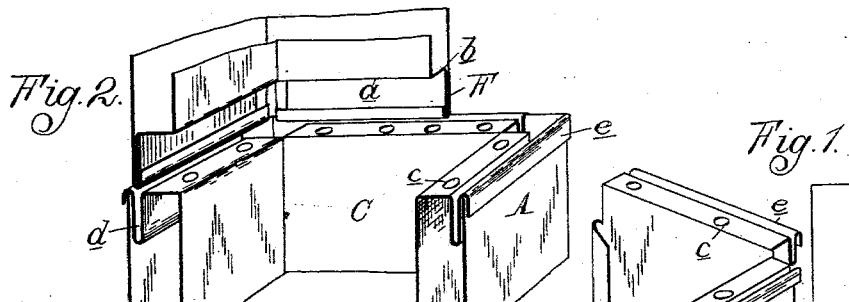
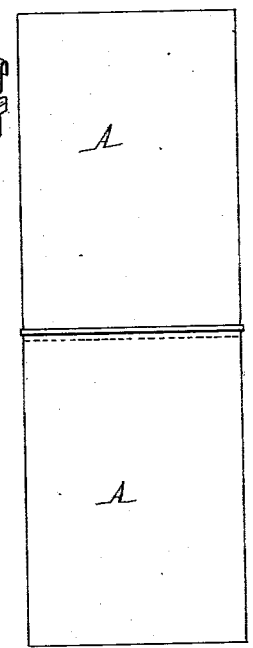
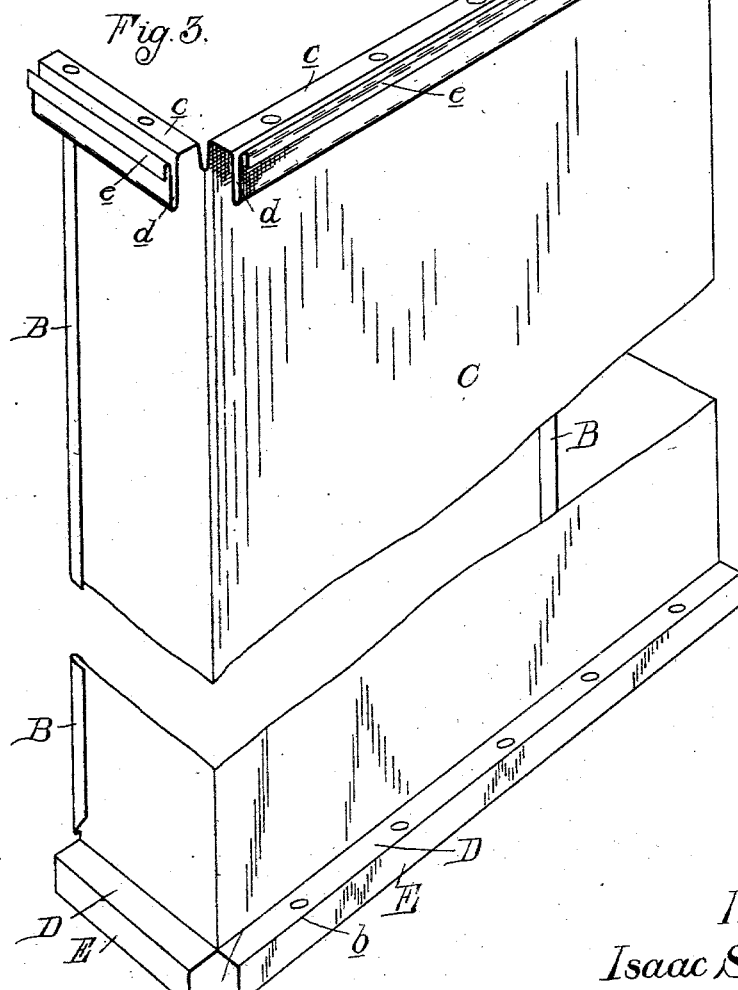
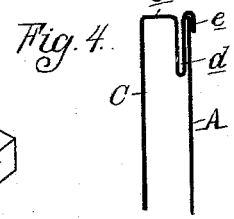
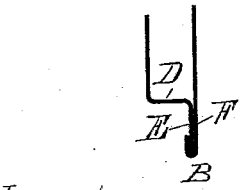
Witnesses:
Inventor:
Isaac Stearns,
By Thos. S. Sprague & Son,
Attorneys.

UNITED STATES PATENT OFFICE.

ISAAC STEARNS, OF DETROIT, MICHIGAN, ASSIGNOR OF ONE-HALF TO SAMUEL STEARNS, OF SAME PLACE.

HOT-AIR PIPE FOR FURNACES.

SPECIFICATION forming part of Letters Patent No. 629,095, dated July 18, 1899.

Application filed March 16, 1898. Serial No. 674,121. (No model.)

*To all whom it may concern:*

Be it known that I, ISAAC STEARNS, a citizen of the United States, residing at Detroit, in the county of Wayne and State of Michigan, have invented certain new and useful Improvements in Hot-Air Pipes for Furnaces, of which the following is a specification, reference being had therein to the accompanying drawings.

The invention consists in the construction of a hot-air pipe, and particularly in the construction of a section of such pipes and in the joints formed at the ends thereof for connecting the two sections together, whereby the construction of such sections is simplified and cheapened and the joint is made more secure and of greater strength, and, further, in the construction, combination, and arrangement of various parts, all as more fully hereinafter described.

In the drawings, Figure 1 is a side elevation showing two of my improved sections secured together. Fig. 2 is a sectional perspective view through the meeting ends of two of my sections of piping engaged together. Fig. 3 is a perspective view of half of an inner wall, showing the manner of bending the metal in over the same. Fig. 4 is a vertical longitudinal section through one wall of a section of my hot-air pipe.

In the previous state of the art it is well known that it is desirable to use a double-walled pipe for hot air—as, for instance, in furnaces—and in such pipes they have heretofore been made in sections with interlocking joints upon the meeting ends; but heretofore, so far as I am aware, there has not been made a pipe-section having a mortise-and-tenon joint or a tongue-and-groove joint in which the tongue and the grooves were made of bends in the plates which form the inner and outer walls themselves. This I accomplish with my construction as follows:

The pipe-sections may be made up in any desired length and are shown rectangular. The outer wall A may be made of simply a straight piece of metal bent into rectangular form, with a hook B at one end. The inner wall is preferably made in two pieces, as shown in Fig. 3, although it may be made of a single piece, with its ends connected together, if desired. The inner wall C has at one end the two bends *a b*, which form the lateral substantially horizontal offset D and the substantially vertical tongue E. In making the pipe from the sheets provided with these bends the metal, of course, is split at the corners, as plainly shown in the drawings. The tongue E engages with the hook B, as shown in Fig. 4. At the opposite end the metal of the inner wall is bent to form first a substantially horizontal offset *c* and then the substantially vertical trough or groove *d* and the hook *e*, the width of the offset and the groove being the same as that of the offset D at the other end, so as to make the desired opening between the two walls, the hook *e* being engaged with the end of the outer wall, as plainly shown in Fig. 4. This forms a double-walled pipe, in effect consisting of an outer wall and an inner wall, the ends of the walls being integrally connected one with the other—that is, without the interposition of a bridge piece or strip at the end, as has heretofore sometimes been used. The offsets D and *c* abut when the sections are in place and are apertured in line, so that there may be the usual air circulation in the hollow walls of the pipe. The corners of the tongues, which project beyond the offset D, are slotted, so that these tongues (lettered F in Fig. 4) may be bent inward somewhat to engage in the grooves *d* and form what I call "flexible" tongues. By making these tongues flexible and cutting them away slightly at the corners I am enabled without any shaping of the outer wall whatever to press them in slightly, so that the tongue of one section will engage into the groove *d* of an adjoining section. By making these tongues and grooves of the proper proportion to each other I am enabled to obtain practically a tight fit at the joints, and in addition to the friction which a tongue-and-groove joint would have I get the friction due to the spring effect of the tongues. By having offsets D at the ends of the pipe-sections I strengthen them materially, so that there is no liability of bending or denting them in handling or shipping, as would be the case in the event that the offsets were down some distance between the side walls of the pipe-sections. Then as the tongue at the other end is entirely flexible if it should be bent in shipping or in handling it is very readily straightened or may be pushed back into shape by the hands of the operator, so that it may be engaged with the groove when the parts are brought together. It will be observed that by this construction I make the outer slots and the end slots of the section from the same piece of metal and at the same time form therein a tongue-and-groove joint.

What I claim as my invention is—

A pipe-section of the character described comprising a plate having one edge bent at right angles forming a horizontal seat provided with air-openings and the outer edge of which is bent down at right angles then upward and finally downward, the other edge of said plate being bent at right angles outward forming a horizontal seat having air-openings and then downward, and a metal face-plate interlocked with the other plate, substantially as set forth.

In testimony whereof I affix my signature in presence of two witnesses.

ISAAC STEARNS.

Witnesses:
M. B. O'DOGHERTY,
OTTO F. BARTHEL.